May 12, 1970  J. W. McGIFFEN ET AL  3,511,181
CREDIT CARD WITH STRUCTURALLY INTERENGAGING COMPONENTS
Filed June 22, 1967
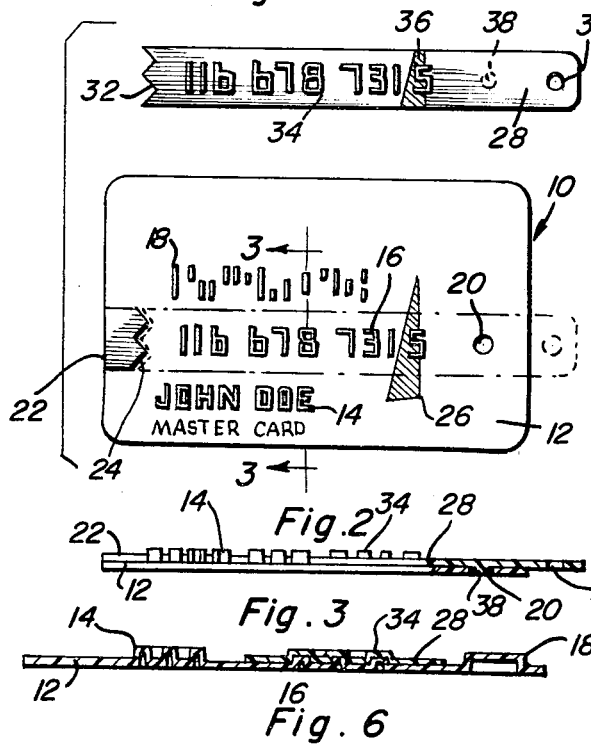
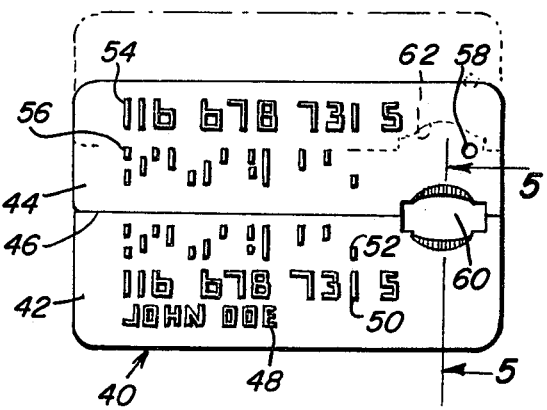
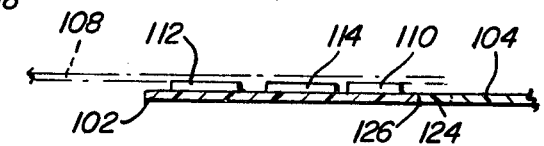
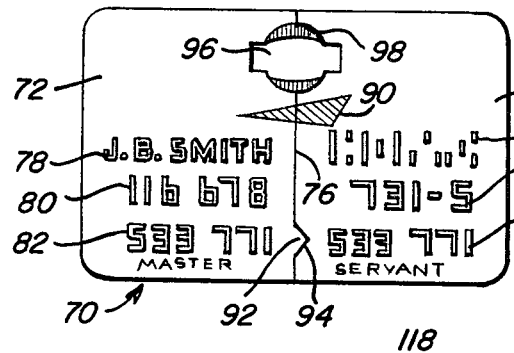
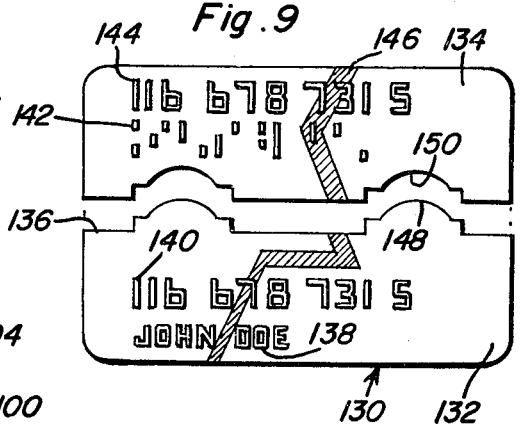
John W. McGiffen
Thomas E. Speer, Jr.
INVENTORS
BY *Clarence A. O'Brien*
*and Harvey B. Jacobson*
Attorneys

United States Patent Office 3,511,181
Patented May 12, 1970

3,511,181
CREDIT CARD WITH STRUCTURALLY INTERENGAGING COMPONENTS
John W. McGiffen, 1124 Rostrevor Circle, Louisville, Ky. 40205, and Thomas E. Speer, Jr., R.R. 3, Box 10A, Vincennes, Ind. 47591
Filed June 22, 1967, Ser. No. 648,010
Int. Cl. B41l 47/02; G09f 3/02
U.S. Cl. 101—369    2 Claims

ABSTRACT OF THE DISCLOSURE

A credit card assembly including two components having interengaging male and female projecting means thereon so that both components must be in the possession of a customer and assembled to enable the credit card to be used.

---

Generally, the present invention relates to credit cards of a two-piece construction employed to facilitate credit sales of products and services. It is well known that many private firms such as oil companies, department stores, motels, hotels and the like have issued credit cards to their customers for use in charging products and services. In addition, there are a number of firms which issue credit cards to be used with various products and services which are members of the organization or association issuing the card. Such credit cards generally comprise a rectangular plastic plate which has embossed therein the serial number of the charge account and the name of the credit card holder and an area is also usually provided for the signature of the holder of the credit card and other advertising indicia or the like may be provided thereon.

When the credit card is used, after the desired purchase has been made, the holder of the credit card hands it to the vendor who places the card in a small manual printing machine. The vendor also fills out a charge slip which usually consists of several copies by writing thereon a description and the cost for the particular item or services which have been purchased. The charge slip is then placed in the printing machine and the machine actuated so that the charge slip is pressed against the credit card by an ink roller or other pressure applying apparatus which prints the serial number and the name of the holder on the charge slip. The credit card holder then signs the charge slip and his card along with a copy of the charge slip are given to him.

One of the serious disadvantages in the credit card system as practiced today is that the various companies issuing credit cards require, as part of the contract with the credit card holder, that they be responsible for any unauthorized charges made on the card before the company is notified that the card has been lost, stolen or misappropriated. Frequently, a wallet may be lost with credit cards therein and a finder is able to charge various items and services on the credit card before the owner of the wallet realizes that it and the credit cards therein are missing and before he can notify the issuing company.

By employing the credit card of the present invention which requires two components to be present in order to use the credit card, if such a card becomes lost, misplaced or stolen, the finder of the missing portion of the card would not be able to make an unauthorized charge inasmuch as the credit card of the present invention is composed of two pieces. One of the pieces such as the top or upper portion is embossed with the holder's social security number and/or data processing tabulating number and is carried on the holder's key ring at all times. The second piece or the bottom or lower portion of the card is also embossed with the holder's social security number and/or data processing tabulating number, his name, and address and is carried in the holder's card case or wallet. When the two components or pieces of the credit card are assembled when the holder desires to make a credit purchase, he merely interlocks the protruding or embossed portions in the upper and lower halves of the card and the card is ready for use. Upon presentation of the card to the vendor or an individual processing the charge transaction, the vendor will visually compare the embossed numbers on the upper portion of the card with the embossed numbers on the lower portion of the card and will also physically interfit the two portions of the card. If both numbers are identical and the cards properly and physically interfit, the charge transaction will be processed. If they are not identical, charge transaction will be refused.

If an error should occur in visual comparison of embossed numbers or physical interfitting of the components of the card at the time the charge transaction is made and charge is consummated, the issuer of the credit card can readily detect any discrepancy when processing holder's charges through data processing. Any instrument of paper or charge slip being processed on which identical numbers do not appear on both the top portion and lower portion of the credit card would be rejected and the amount of charge shown thereon would not be included in the total amount billed to the holder thus avoiding the problems of the holder of the card being charged for items and services which he did not procure.

When charges are classified as discrepancies by the data processing operation, they can be traced instantly. The issuer of the credit card may resort to a master index social security and/or data processing tabulating number file to determine to whom number shown on the upper portion of the card has been issued. A letter addressed to the card holder to which number is assigned (enclosing a photostatic copy of the discrepancy charge) should bring discrepancy transaction to an immediate settlement. The number shown on the lower portion of card is readily identified since the name is shown thereon.

The interfitting male and female projections and recesses may incorporate the design of a company emblem, trademark or the like thus requiring that not only the numbers be identical but the two components of the credit card be interfitted by superposing one upon the other, matching horizontal top and bottom edges, matching vertical side edges or the like. Absolute protection is assured the owner or holder of the credit card inasmuch as no charges can be made with a one-half section or only one-half of the card. Thus, even if one part of the card is lost or stolen, no unauthorized charges can be made without the other half. This construction then results in reduction and substantial elimination of losses due to unauthorized use of credit cards. When one-half of a credit card has been used, the entire credit assembly would be cancelled and a new two-piece credit card would be issued to the holder.

In accordance with the preceding, an important object of this invention is to provide a two-piece credit card both of which are required to be present when making a charge and both of which have identical identifying numbers thereon and which have structural interconnection in order that a charge cannot be made unless both pieces or components of the credit card are presented to the vendor. In addition, the credit card of the present invention is relatively inexpensive, foolproof in operation and affords protection against losses to the issuing agent or company, the vendor and the customer or holder of the card.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of a credit card assembly in accordance with the present invention illustrating the two components thereof in the form of a card and overlay or proving device;

FIG. 2 is a longitudinal sectional view of the card and overlay proving device associated therewith;

FIG. 3 is a transverse, sectional view taken substantially upon a plane passing along section line 3—3 of FIG. 1 illustrating further structural details of the credit card assembly;

FIG. 4 is a plan view of another embodiment of the credit card;

FIG. 5 is a detail sectional view taken substantially upon a plane passing along section line 5—5 of FIG. 4 illustrating the structural details thereof;

FIG. 6 is a plan view of another embodiment of the invention in which the credit card is separated into two sections along a vertical line of separation;

FIG. 7 is a plan view of another embodiment of the invention illustrating its association with a charge slip;

FIG. 8 is a sectional view taken substantially upon a plane passing along section line 8—8 of FIG. 7 illustrating the structural details thereof; and FIG. 9 is a top plan view of another embodiment of the invention.

Referring now specifically to the drawings, the numeral 10 generally designates the credit card assembly illustrated in FIGS. 1–3 which includes a generally rectangular card 12 constructed of laminated plastic, plastic material or the like which is generally rectangular and provided with rounded corners and of a size comparable to presently employed credit cards. The card 12 is considered the master card and is provided with raised or embossed indicia 14 identifying the holder by name and address if desired. Also provided on the card 12 is raised or embossed numbers 16 whcih may be a social security number or data tabulating number. Also provided on the card 12 is indicia 18 for use in conjunction with data processing machinery.

Adjacent one end of the card 12, there is provided a small hole 20 in alignment with the indicia 16 and adjacent the opposite end of the card 12, there is a raised or embossed area 22 having an irregular inner edge 24 defined by V-shaped projections which face toward the indicia 16 and in alignment therewith. Also, as distinguishably colored area 26 is formed on the card 12 across the portion of the indicia 16 adjacent the hole 20. It will be appreciated that the shape and configuration of the distinguishably colored area 26 may be varied and the protrusion or embossment 22 may also be distinguishably colored as desired and the embossed indicia 14, 16 and 18 may also be distinguishably colored for easy observation thereof.

The second component of the credit card assembly 10 is in the form of an elongated relatively narrow strip or narrow card 28 constructed of a plastic material similar to the card 12 and being slightly longer than the card 12 so that one end thereof may be provided with an aperture 30 which may be employed for mounting the strip or card 28 on a key ring, key chain or the like. The end of the strip or card 28 remote from the mounting hole 30 is provided with an irregular end edge 32 defined by a plurality of V-shaped notches which correspond with and are complementary to the irregular edge 24. Formed on the panel 28 is embossed or raised indicia 34 comparable with and identical to the indicia 16. Transversely of the strip or card 28 and the indicia 34 thereon is a distinguishable colored area 36 and in alignment with the indicia 34 the strip or card 28 is provided with a depending projection or detent 38 capable of projecting into and reception in the aperture 20 in the card 12.

As illustrated in FIG. 3, the indicia 34 is raised or embossed upwardly thus defining a female recess in the lower surface thereof so that the indicia 34 will fit onto and be received on the indicia 16 with the depending projection or detent 38 projecting into the hole 20 and the notched edge 32 engaging the notched edge 24 thus requiring that in order to employ the credit card assembly 10, the indicia 16 and 34 must be identical and the location of the hole 20 and detent 38 must be identical and the configuration of the edges 24 and 32 must be identical. In addition, the distinguishably colored area 36 must be identical to that portion of the distinguishably colored area 26 which it covers when assembled on the master card 12. In addition to the above, the strip or card 28 may be dark while the indicia 34 may be transparent to enable ready observation of the identical or nonidentical character of the indicia 34 and 16.

In this assembly, the strip or card 28 is in the form of a proving device in that the holder of the credit card must not only present to the vendor the card 12 but also the proving card or strip 28 so that the vendor may place the proving strip or card 28 into overlying and interfitting relationship to the indicia on the card 12. The assembled cards 12 and 28 may then be placed in a printing machine along with a charge slip or, if desired, the printing machine may only receive the card 12 with the strip or card 28 being only employed as a proving device to satisfy the vendor that the credit card assembly is being employed by the person to whom it was issued.

The extra long overlay strip 28 is provided so that it can be used as a proving device without being detached from the key ring or key chain. With this construction, a standard size credit card not only has embossed or raised numbers for identification of the card holder but in addition has a female construction in the form of the notched edge 24 to receive a corresponding male section of the overlaying proving device such as the notched edge 32 on the strip or panel 28. When the male section of the proving overlay is keyed or fitted into the female section of the standard card 12, the embossed identifying numbers 16 of the card 12 will correspondingly fit into a female section 34 of the overlay strip 28. The female section of the overlay strip, which is also the card holder's number, is so constructed that only the number will be transparent. Thus, when the transparent numbers of the overlay strip 28 are secured in place, the transparent numbers will be completley filled in with the male numbers 16 of the card 12 thus providing an interlocking or proof to authenticate the overlay section 28 with the master card 12.

The credit card assembly illustrated in FIGS. 4 and 5 is generally designated by the numeral 40 and includes two sections 42 and 44 each of which is generally narrow and rectangular in configuration with the two sections 42 and 44 being joined together along an edge 46 to form a composite card having a generally rectangular configuration of a size and shape similar to conventional credit cards. In this construction, the section 42 which may be considered the master section or master card is provided with embossed indicia 48 indicating the name and/or address of the holder together with the adjoining embossed identifying indicia 50 and additional indicia 52 for use with data processing machinery. The secton 44 is provided with indicia 54 identical to the indicia 50 and indicia 56 identical to the indicia 52 and all of the indicia is embossed or raised. The section 44 is also provided with an opening 58 to enable it to be carried on a key ring, key chain or the like.

Adjacent one end portion of the abutting edge or division line 46, the section 42 is provided with a laterally extending projection 60 of a particular shape and configuration which may be termed irregular and which represents approximately one-half of a well-known business emblem, trademark or the like. Correspondingly, the abutting edge of the section 44 is provided with a recess 62 which matches and receives the projection 60. Thus, in order for the two sections 42 and 44 to be assembled into the position illustrated in FIG. 4, the recess 62 and the projection 60 must correspond with each other in both location along the abutting edge 46 and in shape, size and configuration so that the male projection 60 will be received in the female recess 62 to form a continuous rectangular card assembly 40 having the same thickness throughout the area thereof so that both card sections, when assembled to form a single card assembly, may be inserted in a manual printing machine. In this assembly, the vendor, of course, will require that both sections 42 and 44 of the card 40 must be present in order to consummate a credit transaction thus serving as a protection for himself, the customer and the business firm or organization issuing the credit card.

FIG. 6 illustrates another embodiment of the invention in which the card assembly is generally designated by the numeral 70 and includes two sections 72 and 74 which are disposed alongside of each other and are separated from each other by a vertical abutting edge 76. The left-hand section 72 may be considered the master section and includes embossed indicia 78 indicating the name of the holder, indicia 80 and indicia 82. The section 74 is provided with indicia 84, indicia 86 and indicia 88. The embossed indicia 88 is identical to the indicia 82 while the indicia 84 is used with data processing machinery and corresponds with the indicia 78. The indicia 86 may be a portion of an identifying number, social security number or the like for further identifying the holder of the card.

The two sections 72 and 74 have a distinguishably colored area 90 provided thereon which bridges the abutting edge 76 so that when the sections 72 and 74 are properly aligned and brought into abutting engagement, the distinguishably colored area 90 will be completed. Also, the edge on the master section 72 is provided with a V-shaped projection 92 adjacent the lower edge thereof and a corresponding recess 94 is provided in the abutting edge of the servant section 74 for receiving the male projection 92. Correspondingly, the upper edge of the abutting edge 76 of the master section 72 is provided with a projection 96 which forms a portion of a well-known business emblem, trademark or the like. The abutting edge of the section 74 is provided with a corresponding female recess 98 for receiving and fitting the male projection 96 as illustrated clearly in FIG. 6.

The vertical split card is unique inasmuch as part of the identification number 80 is on one-half of the card or master section 72 and the other half of the number 86 is located on the remaining portion or servant section of the card thus completing or "locking in" and controlling the charge number. The proving of each section of card or both halves is with several methods including the keying and interlocking or fitting together of the two cards and with the correlation of numbers as shown on the master card and the matching number on the servant card.

FIG. 7 illustrates another embodiment of the invention including two sections 102 and 104 which are joined together along horizontal abutting line 106 with the two sections 102 and 104 combining to form substantially a rectangular credit card assembly which is illustrated in use with a charge slip 108 which has the upper edge portion thereof overlying the section 102 when employed with the printing machine. The charge slip 108 is provided by the vendor and the section 102 has raised or embossed indicia 110, 112 and 114 thereon while the section 104 has embossed indicia 116 corresponding and identical to the indicia 112 and indicia 118 corresponding with and identical to the indicia 114. Along the abutting edge, the section 102 is provided with a pair of projections 120 which is partially spherical for interfitting in a pair of corresponding recesses 122 in the section 104. At the opposite end of the abutting edge 106, the section 104 has projections 124 which are received in female recesses 126 in the section 102. Thus, when the sections 102 and 104 are interlocked by interlocking the tabs 120 and 124 with the recesses 122 and 126, an assembled card 100 is provided for use with the charge slip 108. Various indicia designating the issuing company or organization may also be provided on the card assembly 100 as desired.

FIG. 9 illustrates another embodiment of the invention generally designated by numeral 130 and including a lower section 132 and an upper section 134 together along a horizontal abutting edge 136 so that when the sections 132 and 134 are assembled, they provide a generally rectangular credit card. The section 132 is provided with raised indicia 138 and 140 while the section 134 is provided with raised indicia 142 corresponding with the indicia 138 on the section 132 and raised indicia 144 identical with the raised indicia 140 on the section 132. Also provided on the card assembly 130 is a distinguishably colored area 146 which is irregular in configuration and direction and may generally be in the form of a zigzag streak of distinguishable color which will be continuous when the sections 132 and 134 are assembled properly along the abutting edge 136. Also, the section 132 is provided with a pair of male projections 148 which extend laterally from the abutting edge 136 and the abutting edge 136 of the card section 134 is provided with corresponding female recesses 150 which are of the same shape and configuration as the male projections 148 thus providing an interfitting relationship. The projection 148 as well as the recess 150 may conform with a portion of a well-known business emblem or trademark. In some instances, the projections 148 may be of different shapes and configurations, that is, one of the projections 148 would be the well-known business emblem or trademark of one organization such as a motel organization while the other projection 148 may be in the form of a business emblem or trademark of an oil company thus indicating that the credit card assembly may be used for both motel services and services or products of the oil company.

In each arrangement, the abutting edges may have one or more projections or recesses corresponding with a portion of the business emblem or trademark or in some instances, the two card sections themselves may be shaped to simulate a well-known business emblem or trademark where such shapes are appropriate to approximate one-half of a card assembly. One of the sections may have an aperture therein for mounting on a key ring or in some instances may be carried in an area separate from the normal wallet or purse.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A credit card assembly comprising a pair of components, each of said components having identifying indicia thereon with at least portions of said indicia being identical, and cooperative means on both of said components to interengage each other for proof that the two components are matching so that not only the indicia on the components can be compared but the two components must physically interengage to indicate that the holder of the credit card assembly has been issued both components, one of the components adapted to be carried separately from the other of the components thereby eliminating accidental loss of both components of the assembly, one of said components being provided with male projecting means and the other of said components comprising female recess means for receiving the male projecting means, said male projecting means being in the form of embossed indicia on one component and the female recess means being in the form of the identical embossed indicia on the other component, the embossed indicia forming the female recess means being transparent to enable observation of the embossed male projecting means on said one component.

2. The structure as defined in claim 1 wherein said one component is in the form of a generally rectangular thin card, one edge of said card having a raised area in alignment with the embossed indicia, said raised area including an irregular inner edge facing the embossed indicia, said other component being in the form of an elongated thin strip having an irregular end edge for matching engagement with the inner edge of the raised area on the card for positioning the embossed indicia on the strip in registry with the embossed indicia on the card.

References Cited

UNITED STATES PATENTS

| | | | |
|---|---|---|---|
| 1,414,666 | 5/1922 | Polivka | 40—2.2 |
| 2,309,398 | 1/1943 | Keller | 283—12 |
| 2,935,941 | 5/1960 | Bradford | 101—369 |
| 3,283,713 | 11/1966 | Wooster | 101—369 |
| 3,287,839 | 11/1966 | Rotwein et al. | 283—7 X |
| 3,350,800 | 11/1967 | Witt et al. | 283—7 X |

ROBERT E. PULFREY, Primary Examiner

E. H. EICKHOLT, Assistant Examiner

U.S. Cl. X.R.

40—2.2